Jan. 29, 1929.

E. W. RAICHE 1,700,335

REFRIGERATING APPARATUS

Filed June 20, 1927

INVENTOR:
ERNEST W. RAICHE,
By: Otto H. Ringle,
his Atty.

Patented Jan. 29, 1929.

1,700,335

UNITED STATES PATENT OFFICE.

ERNEST W. RAICHE, OF LOS ANGELES, CALIFORNIA, ASSIGNOR TO RAICHE MANUFACTURING COMPANY, OF LOS ANGELES, CALIFORNIA.

REFRIGERATING APPARATUS.

Application filed June 20, 1927. Serial No. 200,073.

This invention relates to devices used for refrigerating and cooling purposes.

One of the objects of this invention is to eliminate bulky machinery and cooling chambers.

Another object is to consolidate, combine, or unite the refrigerating chamber with hardening chambers and cooling compartments in one compact comparatively small apparatus.

Another object is to arrange a cooling room of comparatively small size adjacent to a refrigerating apparatus controllable by a single compressor.

Another object is to provide a compact unit inclosing a refrigerating section, a hardening section and a cooling section, the several sections arranged in such an order as to maintain different temperatures by a common refrigerating and cooling source.

Other objects will appear from the following description and appended claims as well as from the accompanying drawing, in which—

Figure 1:
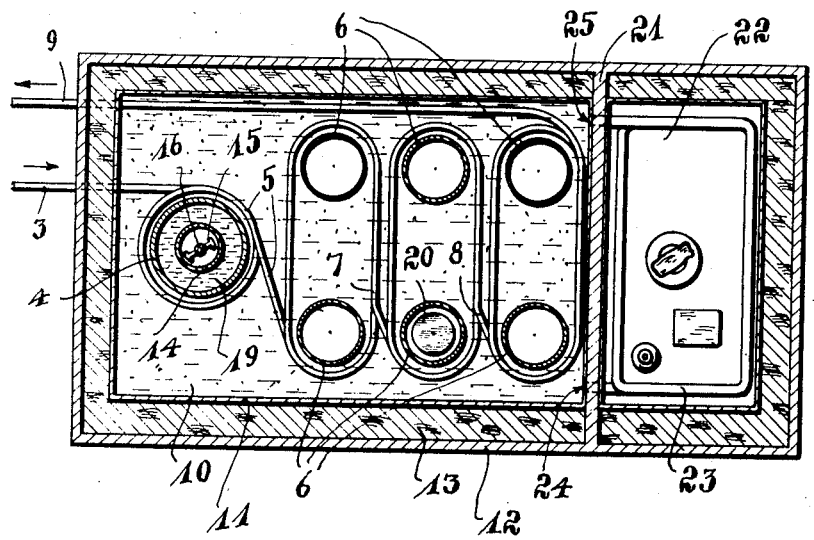
Fig. 1 is a horizontal section through a simple box-like structure, embodying a refrigerating chamber, hardening chambers and a cooling chamber designed according to this invention.

In ice cream refrigerating, an agitator is commonly arranged in an ice cream freezing tank constantly in motion, and coils of pipes are connected to a compressor. The frozen ice cream handle in such a refrigerator, or agitator, or freezing tank, is generally after freezing placed in hardening chambers of comparatively bulky size. A further separate compartment is commonly required, in which the temperature is maintained at a suitable degree for merely keeping matter slightly cool above or near the freezing temperature.

In common stores, or vending, or dispensing places such comparatively bulky chambers and apparatus cannot always be maintained for lack of room.

The herewith disclosed apparatus is therefore principally designed to provide a unit embodying a freezing section, a hardening section and a section of comparatively higher temperatures.

As illustrated in the drawing, coils are provided within the whole apparatus to be connected to a compressor, not shown in the drawing. The inlet end of the compressor coil line is indicated at 3, encircling an ice freezing tank 4 starting at a point near the bottom and winding to a point near the top and from the upper coil continuing into the next section as indicated at 5. The next section includes a group of hardening tanks 6. The pipe line from the point 5 is continued downwardly and then arranged to encircle in a second coil the first two hardening tanks 6 and in a similar manner again from the top point indicated at 7 brought to continue from a point near the bottom in a third coil to extend to a point near the top around the second two hardening tanks 6 to again continue from the top coil, indicated at 8, downwardly to, for a fourth time, encircle in a continuous coil the last two tanks of the group of hardening tanks 6 from a point near the bottom to a point near the top of these tanks to finally bring the coil pipe line to discharge from the whole apparatus as indicated at 9.

The whole coil including the ice cream freezing tank 4 and the hardening tanks 6 are imbedded in a mass of brine indicated at 10 within a sheet iron inner casing 11.

The brine indicated at 10, surrounding in common the ice freezing tank 4 as well as the several hardening tanks 6, is preferably a calcium brine.

The casing 11 is inclosed in an outer housing 12, spaced by a cork insulation or padding 13, inserted between the casing 11 and the housing 12.

Figure 2:
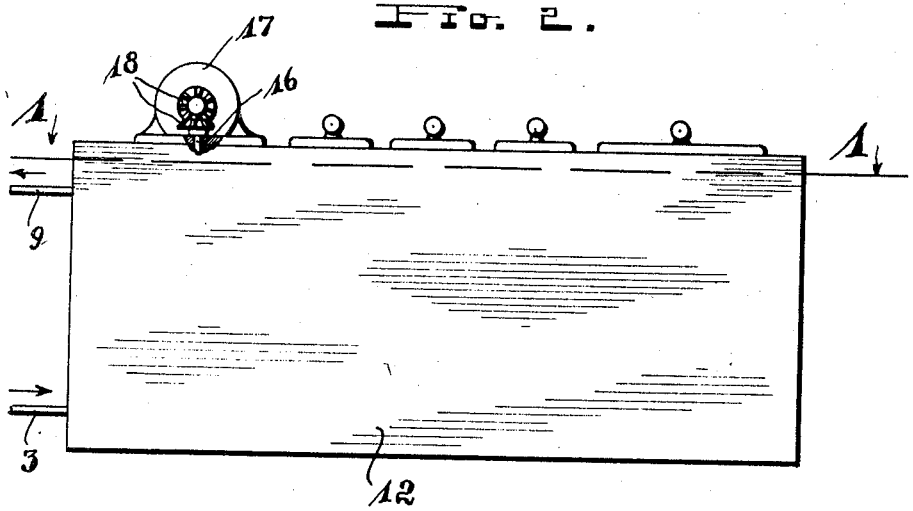
Fig. 2 is a front elevation of a box-like structure designed and arranged according to this invention, having a motor roughly outlined on top with means whereby an agitator within the refrigerating section may be operated.

A removable ice cream holding container 14 is disposed within the ice cream freezing tank 4, having also an agitator 15 on the shaft 16 indicated within the container 14, which may be of any well known type, not particularly described or claimed in this application. The shaft 16 is illustrated in Fig. 2 as operatively connected to a motor 17 by the gears 18.

Between the ice cream freezing tank 4 and the container 14 a refrigerant preferably of common salt brine is inserted and disposed as indicated at 19 in Fig. 1.

Ice cream may be disposed in the container 14 and frozen in any well known manner by any well known mechanism, as by agitators referred to above with this arrangement.

After being frozen the ice cream is disposed in any one of the hardening tanks 6, as indicated at 20 in one instance, for the commonly required further hardening.

A partition 21 is provided within the housing 12, forming a cooling chamber 22 in the further end of the housing for cooling milk, butter and other articles, commonly used and needed in a dispensing, or vending place, or small store, as a drug store or soda fountain place.

This cooling chamber is provided with a coil 23 in communication with the brine 10 in the adjoining larger chamber, the coil communications being indicated at 24 and 25, whereby the brine 10 of the larger compartment is caused to circulate through the coil 23 by reason of the fact that the top of the mass of brine is naturally warmer than the bottom and the one communication being made at a lower point, while the other communication being arranged at a higher point between the two compartments, so as to produce an automatic circulation of the brine from the larger compartment through the coil 23.

This circulation of brine from the larger compartment through the coils 23 in the smaller compartment 22 is sufficient to cool milk, butter and other articles above referred to.

By arranging the several comparatively small hardening tanks 6 in a common compartment together with the ice freezing tank 4 within a common mass of brine 10 in the manner illustrated in the drawing and described above makes it possible to accomplish results that can commonly only be gained with much larger hardening boxes and compartments.

Having the hardening tanks arranged together with the ice cream freezing tank within one housing and within a common mass of brine assures, furthermore, a more economical use of brine and other refrigerants than could be possible with arrangements where the ice cream freezing tank is in a separate apparatus and the hardening tanks also in a separate comparatively large box or structure. Using, furthermore, the calcium brine from the ice cream freezing and hardening compartment in a coil disposed in the adjoining cooling compartment assures a further reduction of structures in this compact unit.

Having thus described my invention, I claim:

1. A refrigerating apparatus consisting of a common housing incasing an ice cream freezing unit, a hardening unit, and a cooling unit, the ice cream freezing unit and the hardening unit being encircled by a common cooling coil consisting of distinct coil sections with the coil section that encircles the hardening unit following and continuing from the coil section that encircles the freezing unit and the whole coil embedded in a common refrigerant, and the cooling unit having a cooling coil in communication with said refrigerant.

2. A refrigerating apparatus comprising a housing having a partition forming a larger and a smaller compartment, a refrigerating unit disposed in the larger compartment, a hardening unit composed of several tanks disposed in the larger compartment besides the refrigerating unit, a pipe coil with outside connections from the housing disposed in the larger compartment encircling the two above cited units in a consecutive manner, a refrigerant disposed in the larger compartment around the two units and around the coil, another coil communicating through said partition with the refrigerant in the larger compartment being disposed in the smaller compartment close to the walls thereof and encircling this compartment by which the smaller compartment is cooled with the automatically circulating refrigerant from the larger compartment.

In testimony that I claim the foregoing as my invention I have signed my name.

ERNEST W. RAICHE.